(12) United States Patent
Nishimura et al.

(10) Patent No.: US 11,809,148 B2
(45) Date of Patent: Nov. 7, 2023

(54) PARAMETER ADJUSTMENT METHOD FOR ADJUSTING CONTROL PARAMETERS FOR DEVICE THAT PERFORMS SERVO CONTROL

(71) Applicant: OMRON Corporation, Kyoto (JP)

(72) Inventors: Maki Nishimura, Kyoto (JP); Mamoru Egi, Kyoto (JP); Yasushi Ono, Kyoto (JP); Kenji Nakajima, Kyoto (JP); Fumiaki Sato, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 59 days.

(21) Appl. No.: 17/614,670

(22) PCT Filed: Mar. 2, 2020

(86) PCT No.: PCT/JP2020/008665
§ 371 (c)(1),
(2) Date: Nov. 29, 2021

(87) PCT Pub. No.: WO2020/261649
PCT Pub. Date: Dec. 30, 2020

(65) Prior Publication Data
US 2022/0221827 A1 Jul. 14, 2022

(30) Foreign Application Priority Data
Jun. 28, 2019 (JP) .................. 2019-120833

(51) Int. Cl.
*G05B 13/04* (2006.01)
*G05B 6/02* (2006.01)

(52) U.S. Cl.
CPC .............. *G05B 13/042* (2013.01); *G05B 6/02* (2013.01)

(58) Field of Classification Search
CPC ................................ G05B 13/042; G05B 6/02
(Continued)

(56) References Cited

U.S. PATENT DOCUMENTS

| 5,191,272 | A | 3/1993 | Torii |
| 2013/0173026 | A1 | 7/2013 | Kawana |
| 2015/0045940 | A1* | 2/2015 | Takeuchi ........... G05B 13/0205 700/159 |

FOREIGN PATENT DOCUMENTS

| JP | H03289385 A | 12/1991 |
| JP | H04149604 A | 5/1992 |

(Continued)

OTHER PUBLICATIONS

International Search Report issued in Intl. Appln. No. PCT/JP2020/008665 dated Apr. 21, 2020. English translation provided.

(Continued)

*Primary Examiner* — Jigneshkumar C Patel
(74) *Attorney, Agent, or Firm* — ROSSI, KIMMS & McDOWELL LLP (57) ABSTRACT

A feedback gain and a speed feed-forward gain are adjusted. A method for adjusting control parameters for a control device that performs servo control on a control target includes calculating an upper limit of a feedback gain of a feedback signal within a range in which a predetermined index for the feedback gain satisfies a predetermined target value with a speed feed-forward gain for speed feed-forward control set at a predetermined reference value, setting the feedback gain at an adjustment initial value lower than the upper limit, setting the speed feed-forward gain at the highest value within a settable range, and increasing the feedback gain from the adjustment initial value within a range in which the feedback gain does not exceed the upper (Continued)

limit with at least the speed feed-forward gain set at a predetermined increased value.

8 Claims, 7 Drawing Sheets

(58) Field of Classification Search
USPC .......................................................... 700/37
See application file for complete search history.

(56) References Cited

FOREIGN PATENT DOCUMENTS

| | | |
|---|---|---|
| JP | H0922305 A | 1/1997 |
| JP | 2006018431 A | 1/2006 |
| WO | 2012057235 A1 | 5/2012 |

OTHER PUBLICATIONS

Written Opinion issued in Intl. Appln. No. PCT/JP2020/008665 dated Apr. 21, 2020. English translation provided.

* cited by examiner

PARAMETER ADJUSTMENT METHOD FOR ADJUSTING CONTROL PARAMETERS FOR DEVICE THAT PERFORMS SERVO CONTROL

FIELD

The present invention relates to a parameter adjustment method for adjusting control parameters for a control device that performs servo control.

BACKGROUND

Some known servo control devices perform feed-forward control in addition to feedback control to quickly match a motor output to a target command. A feed-forward controller installed in such a servo control device appropriately sets a speed feed-forward gain or a torque feed-forward gain to set deviation of the motor to zero at a constant acceleration or deceleration or a constant speed and to minimize deviation at an acceleration change. However, such a feed-forward controller typically includes a user's efforts to find an appropriate value, such as a speed feed-forward gain, to be set to the feed-forward controller while checking motor outputs, and thus places a burden on the user.

For example, Patent Literature 1 describes a technique for automatically adjusting a value such as the speed feed-forward gain in such a feed-forward controller to an appropriate value. This technique automatically adjusts a value such as the speed feed-forward gain based on deviation (position deviation) of a motor output (position output) from a target position command. More specifically, a motor is operated with a value such as the speed feed-forward gain at an initial value, and the initial value is corrected as appropriate based on the deviation at that time. After repeated changes of the value such as the speed feed-forward gain, the value such as the speed feed-forward gain is determined to be the value that minimizes the deviation.

CITATION LIST

Patent Literature

Patent Literature 1: Japanese Unexamined Patent Application Publication No. 2006-18431

SUMMARY

Technical Problem

The known servo control device, which adjusts a speed feed-forward gain based on position deviation, cannot fully increase the speed feed-forward gain depending on the resulting position deviation, and cannot fully increase followability to the target command. Although the known servo control device adjusts the speed feed-forward gain, adjustment of a feedback unit gain (feedback gain) in servo control is not described. For the entire servo control, the known servo control device may fail to adjust motor outputs as intended. More specifically, without reflecting the balance between the feedback gain and the speed feed-forward gain, the known servo control device may finally fail to perform intended servo control on motor outputs.

One or more aspects of the present invention are directed to a technique in a control device that performs servo control including feed-forward control for adjusting a feedback gain and a speed feed-forward gain.

Solution to Problem

In response to the above issue, the structure according to one or more aspects of the present invention first calculates an upper limit of a feedback gain under conditions in which a predetermined index for servo control performed by a control device satisfies a predetermined target value, then resets a speed feed-forward gain to a higher value, and adjusts the feedback gain within a range not exceeding the upper limit. This structure facilitates adjustment of a feedback gain and a speed feed-forward gain that allow the control device to perform servo control causing a small track-followability error.

More specifically, a method according to one aspect of the present invention is a method for adjusting control parameters for a control device including a feedback unit and a predetermined control structure. The feedback unit includes one or more controllers to receive an input of a feedback signal for servo control on a control target as feedback. The predetermined control structure performs speed feed-forward control in the feedback unit. The method includes calculating an upper limit of a feedback gain of the feedback signal within a range in which a predetermined index for the feedback gain satisfies a predetermined target value with a speed feed-forward gain for the speed feed-forward control set at a predetermined reference value, setting the feedback gain at an adjustment initial value lower than the upper limit and setting at least the speed feed-forward gain at a predetermined increased value higher than the predetermined reference value, and increasing the feedback gain from the adjustment initial value within a range in which the feedback gain does not exceed the upper limit with the speed feed-forward gain set at the predetermined increased value.

The control device having the control parameters adjusted with the above method includes the predetermined control structure including the feedback unit including one or more controllers. The predetermined control structure can perform speed feed-forward control. The one or more controllers set a feedback gain such as a position proportional gain, a speed proportional gain, or a speed integral gain. The set value characterizes servo control characteristics with the predetermined control structure. Examples of the servo control characteristics include a setting time for the control target or vibration characteristics during control, each of which is the predetermined index. The speed feed-forward gain for the speed feed-forward control is highly relevant to track followability of the control target in servo control. Thus, in servo control on the control target, the feedback gain and the speed feed-forward gain are used as control parameters that may greatly affect the control results.

The method includes, as a first step, calculating the upper limit of the feedback gain with the speed feed-forward gain set at a predetermined reference value to allow servo control characteristics with the predetermined control structure to be intended characteristics or within a range in which the predetermined index satisfies a predetermined target value. The speed feed-forward gain is set at the predetermined reference value because the track followability of the control target being high from the beginning can affect transition of the predetermined index, and may disable accurate calculation of the upper limit of the feedback gain with reference to the predetermined index. As the feedback gain is higher, the responsiveness in servo control typically increases, whereas the stability in servo control tends to decrease in contrast.

Technically, the upper limit of the feedback gain calculated in the first step serves as a threshold that can achieve optimum servo control characteristics.

In a second step, the feedback gain is set at an adjustment initial value lower than the upper limit calculated in the first step, and then the speed feed-forward gain is set to a predetermined increased value. This predetermined increased value exceeds a predetermined reference value, and can increase the track followability in servo control on the control target. An example of the predetermined increased value is 100% or approximate to 100%. In the second step, the speed feed-forward gain is set at the predetermined increased value to increase the track followability of the control target. The feedback gain is set at a relatively low adjustment initial value to prevent an unexpected situation in servo control on the control target resulting from interaction between the speed feed-forward gain and the feedback gain. In a third step that follows, with the speed feed-forward gain set at the predetermined increased value, the feedback gain is adjusted to increase toward the upper limit calculated in the first step. The feedback gain is adjusted within the range not exceeding the upper limit.

In this parameter adjustment, the speed feed-forward gain highly relevant to the track followability can be determined to be the predetermined increased value. The feedback gain can be determined to be the upper limit at which the predetermined index for servo control is set at a predetermined target value, or the feedback gain can be approximated to the upper limit as far as possible. Thus, both control parameters can be easily adjusted.

In the method according to the above aspect, the predetermined index may be an index for a setting time for the control target under servo control based on the predetermined control structure. In this case, the upper limit may be a value of the feedback gain at which the predetermined index is within a target setting time being the predetermined target value. In another aspect, the predetermined index may be an index for vibration of the control target under servo control based on the predetermined control structure. In this case, the upper limit may be a value of the feedback gain at which the predetermined index is lower than or equal to a vibration level being the predetermined target value. In another aspect, the predetermined index may be an index for a gain or a phase obtained from a speed open loop or a closed-loop gain in a frequency response of a speed closed loop in the predetermined control structure under servo control based on the predetermined control structure. In this case, the upper limit may be a value of the feedback gain at which the predetermined index is lower than or equal to a predetermined peak gain or higher than or equal to a predetermined gain margin or a predetermined phase margin. Instead of these indices, the predetermined index may be any index that allows determination as to whether the servo control characteristics with the predetermined control structure achieve intended characteristics.

In the method according to any of the above aspects, in the increasing the feedback gain from the adjustment initial value, in response to a vibration level of the control target exceeding an allowable level, a value of the feedback gain may be determined within a range in which the vibration level is within the allowable level. Such a method can set the feedback gain at the highest value within the range in which the vibration level of the control target is within an allowable range.

In the method according to any of the above aspects, the calculating the upper limit of the feedback gain may be performed while a filtering process is being performed based on a position proportional gain or a speed proportional gain in the servo control. Using the filtering process in the first step allows accurate calculation of the upper limit of the feedback gain when a position command to the control target contains a frequency component causing resonance. Thus, the finally obtained feedback gain and speed feed-forward gain can be adjusted.

In the method according to any of the above aspects, in the increasing the feedback gain, the feedback gain may be adjusted without a filtering process being performed based on a position proportional gain or a speed proportional gain in the servo control. Performing the filtering process may reduce track followability of the control target. In response to this, after the speed feed-forward gain is set at the predetermined increased value in the second step, the feedback gain is adjusted in the third step to optimize the track followability. Adjustment of the feedback gain in the third step is thus to be performed without performing the filtering process for a further intended value.

Advantageous Effects

The control device that performs servo control including feed-forward control can adjust a feedback gain and a speed feed-forward gain.

DETAILED DESCRIPTION

Example Use

Figure 1:
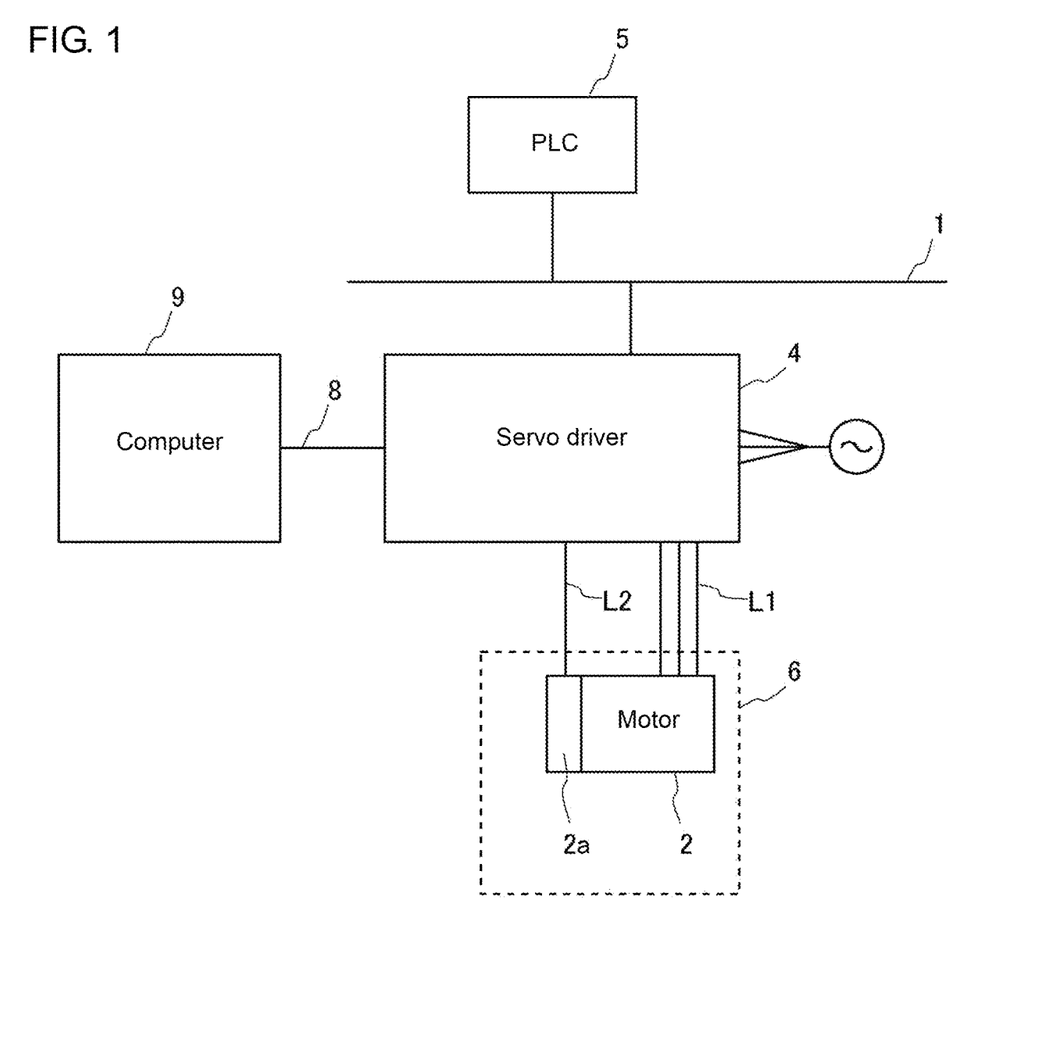
FIG. 1 is a schematic diagram of a control system including a programmable logic controller (PLC) and a servo driver, with a computer connected to the control system.

The structure of a control system for performing servo control on a motor will first be described with reference to FIG. 1. FIG. 1 is a schematic diagram of the control system. The control system includes a field network 1, a servo driver 4, and a programmable logic controller (PLC) 5. The servo driver 4 is a control device for performing servo control on an output shaft of a motor 2 included in a device 6. An example of the device 6 is a transport device that transports a workpiece on a predetermined flat surface. The device 6 may also include a control shaft controllable with a motor other than the motor 2. In this case, the single servo driver 4 may drive two control shafts (motors), or one servo driver may be provided for each control shaft, and the servo drivers may be connected to each other with the field network 1. The PLC 5 provides, to the servo driver 4, a command for driving and controlling the device 6 with the field network 1. An example of the field network 1 is EtherCAT (registered trademark).

In the control system, the servo driver 4 uses a control command transmitted from the PLC 5 to perform servo control on the motor 2. The servo control is performed to, for example, position the motor. The servo driver 4 that has received the control command from the PLC 5 receives, with a signal line L2, a feedback signal output from an encoder 2a connected to the motor 2 and supplies driving current to the motor 2 with a power supply line L1 to cause an output of the motor 2 to follow the control command. Alternating current power fed from an alternating current power supply to the servo driver 4 is used for this supply current. In the present embodiment, the servo driver 4 receives three-phase alternating current, but may receive single-phase alternating current.

A computer 9 is electrically connected to the servo driver 4. The electrical connection may be achieved with wired connection. For example, the computer 9 is connected to the servo driver 4 with a communication cable 8 being a universal serial bus (USB) cable. The computer 9 may be wirelessly connected to the servo driver 4. The computer 9 is a device for setting or adjusting control parameters for the servo driver 4 to perform servo control on the motor 2, and includes an adjustment program. More specifically, the computer 9 includes components such as a calculation device, a memory, and a display (display device), and includes the adjustment program executable for these components. This adjustment program adjusts appropriate control parameters depending on the purpose of servo control performed by the servo driver 4. Specific adjustment of control parameters performed by the computer 9 will be described later.

Figure 2:
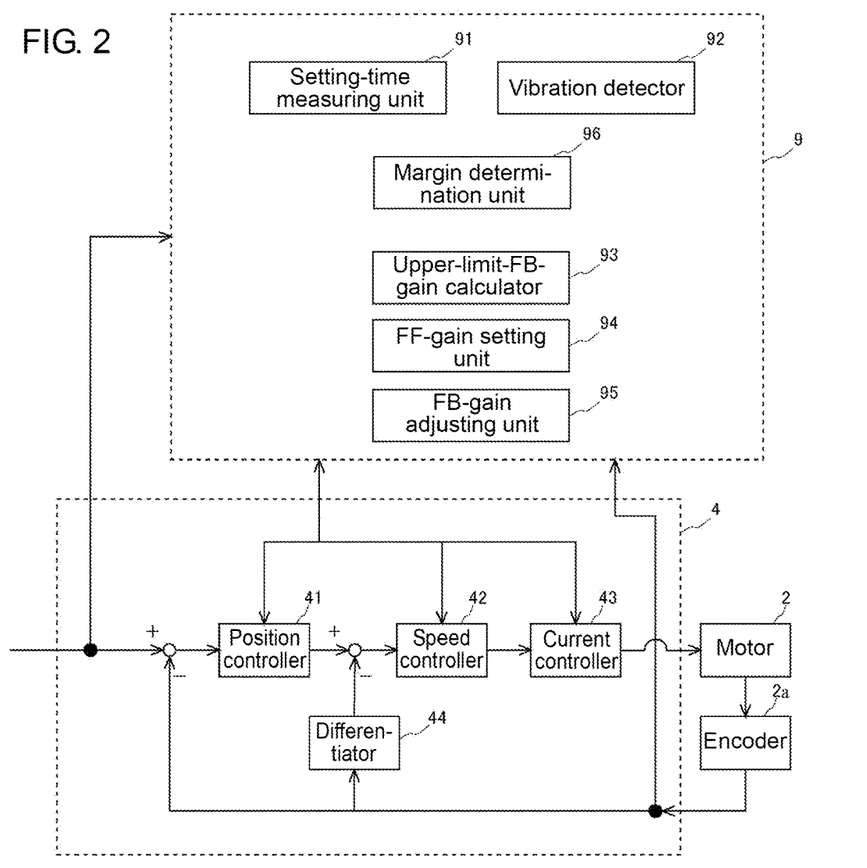
FIG. 2 is a diagram of the servo driver showing its control structure and of functional units in the computer for adjusting control parameters to be set for the servo driver.

The control structure for servo control included in the servo driver 4 in the present embodiment will now be described with reference to FIG. 2. The servo driver 4 includes a feedback unit including a position controller 41, a speed controller 42, and a current controller 43 to perform servo control on the motor 2. The position controller 41 performs, for example, proportional control (P control). More specifically, the P control includes multiplication of position deviation, or deviation of the detection position of the motor 2 from the position command from the PLC 5, by a predetermined position proportional gain. The position controller 41 also adds, to the output (product of the position deviation and the predetermined position proportional gain) from the P control, a signal obtained by performing predetermined differentiation on the position command from the PLC 5 and multiplying the resultant by a predetermined gain to calculate a speed command vcmd. More specifically, the position controller 41 performs speed feed-forward control. The predetermined gain is a parameter for adjusting contribution of the speed feed-forward control, and is referred to as a speed feed-forward gain. In the present embodiment, any value within the range of 0 to 100% may be set as the speed feed-forward gain.

The speed controller 42 performs, for example, proportional-integral control (PI control). In PI control, the speed controller 42 multiplies an integral of speed deviation, or deviation of the detection speed of the motor 2 (obtained by differentiating the output of the encoder 2a by a differentiator 44) from the speed command vcmd calculated by the position controller 41, by a predetermined speed integral gain, and multiples the sum of the resultant and the speed deviation by a predetermined speed proportional gain to calculate a torque command τ Ccmd. Instead of PI control, the speed controller 42 may perform P control. The current controller 43 outputs a current command Ccmd based on the torque command τ Ccmd calculated by the speed controller 42 to drive and control the motor 2 with the current command Ccmd.

The position controller 41 may include a filter used in a filtering process for the position command transmitted from the PLC 5. In the filtering process, the filtering performance for, for example, a cut-off frequency is adjusted based on the position proportional gain or the speed proportional gain. Similarly, the current controller 43 may include a filter (primary low-pass filter) for the torque command or one or more notch filters and use these filters to perform a filtering process. Control parameters to be adjusted by the computer 9 may include a parameter for the performance of these filters.

The computer 9 executes the adjustment program to adjust the control parameters (feedback gains including the position proportional gain, the speed integral gain, and the speed proportional gain, and parameters for the filtering process) for servo control performed by the servo driver 4. The computer 9 is to check whether the control parameters adjusted through the execution of the adjustment program are appropriate for driving the motor 2 included in the device 6. Thus, feedback signals from the encoder 2a and signals from controllers in the servo driver 4 are provided to the computer 9 as information about the operation of the motor 2 during adjustment of the control parameters. Based on these signals, the computer 9 analyzes the operation of the motor 2, and displays the analysis results on the display.

The details of the adjustment program will now be described with reference to FIG. 2. As shown in FIG. 2, the computer 9 includes, as functional units for adjusting control parameters, a setting-time measuring unit 91, a vibration detector 92, an upper-limit-FB-gain calculator 93, an FF-gain setting unit 94, an FB-gain adjusting unit 95, and a margin determination unit 96. These units are implemented by execution of the adjustment program. In the present embodiment, the FB gain indicates the feedback gain, and the FF gain indicates the feed-forward gain.

The setting-time measuring unit 91 is a functional unit for measuring the setting time under servo control on the motor 2 performed by the servo driver 4. The setting time is one of the servo control characteristics. For the servo control being performed to move the output shaft of the motor 2 to a target position, the setting time is defined as time elapsed from the theoretically calculated time of arrival at the target position to when the output shaft of the motor 2 is actually placed within a predetermined range. The feedback gain with an excessively high value typically causes a hunting operation in which the output shaft moves past the target position and then moves vibrationally. In contrast, the feedback gain with an excessively low value delays an arrival of the position of the output shaft at the target position. Based on the high relevance with the feedback gain, the setting time for the motor 2 is measured by the setting-time measuring unit 91 as one of the servo control characteristics.

The vibration detector 92 is a functional unit for detecting vibration under servo control on the motor 2 performed by the servo driver 4. The vibration is one of the servo control characteristics. The vibration detectable by the vibration detector 92 may be one or more types of vibration highly relevant to the feedback gain, among types of vibrations including electrical vibration of controllers for servo control included in the servo driver 4 and vibration of feedback signals from the encoder 2a. When, for example, the amplitude of vibration to be detected exceeds an allowable vibration level, the vibration detector 92 can determine detection of vibration unintended for servo control.

The margin determination unit 96 is a functional unit for determining the peak gain of a speed closed loop, or the gain margin or the phase margin calculated from a speed open loop under servo control on the motor 2 performed by the servo driver 4. The peak gain, the gain margin, or the phase margin is one of the servo control characteristics. More specifically, the margin determination unit is a functional unit that determines the degree of the stability margin of the frequency characteristics during servo control. The peak gain of the speed closed loop, and the gain margin or the phase margin of the speed open loop can be obtained by a known technique.

The upper-limit-FB-gain calculator 93 is a functional unit that performs a first process (refer to FIG. 4) described later. This first process mainly includes calculating the upper limit of the feedback gain based on the predetermined index for the feedback gain. Examples of the predetermined index include the setting time and vibration during servo control, which are servo control characteristics highly relevant to the feedback gain. As described above, the setting time is obtained by the setting-time measuring unit 91, and the vibration during servo control is obtained by the vibration detector 92.

The FF-gain setting unit 94 is a functional unit that performs a second process (refer to FIG. 5) described later. This second process mainly includes setting the speed feed-forward gain to a relatively high gain value (or the predetermined increased value herein, for example, 100%) for achieving high track followability, and resetting the feedback gain to the initial value. In addition to the speed feed-forward gain, the FF-gain setting unit 94 may also set the torque feed-forward gain included in the control structure to a relatively high value. The FB-gain adjusting unit 95 is a functional unit that performs a third process (refer to FIG. 6) described later. This third process mainly includes gradually increasing the feedback gain with the speed feed-forward gain set at, for example, 100% in the second process to determine a final feedback gain. In adjusting the feedback gain in the third process, the FB-gain adjusting unit 95 determines the value of the final feedback gain within a range not exceeding the upper limit determined in the first process.

These functional units in the computer 9 perform processes for adjusting the control parameters. Thus, the servo driver 4 that performs servo control including feed-forward control adjusts the feedback gain and the speed feed-forward gain. Thus, the servo driver 4 can allow the characteristics in servo control on the motor 2 to be intended characteristics, or characteristics approximate to intended characteristics. The speed feed-forward gain set at 100% can increase the track followability of the motor 2.

Process for Adjusting Control Parameters

Figure 3:
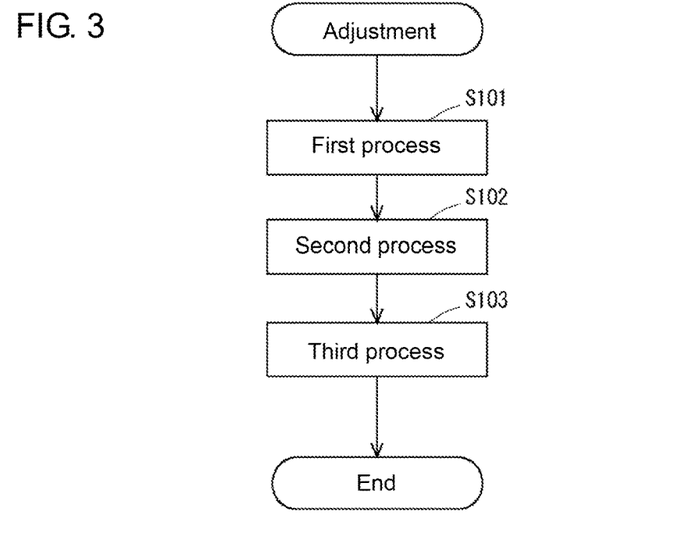
FIG. 3 is a flowchart of an adjustment process for adjusting control parameters in the servo driver.
Figure 4:
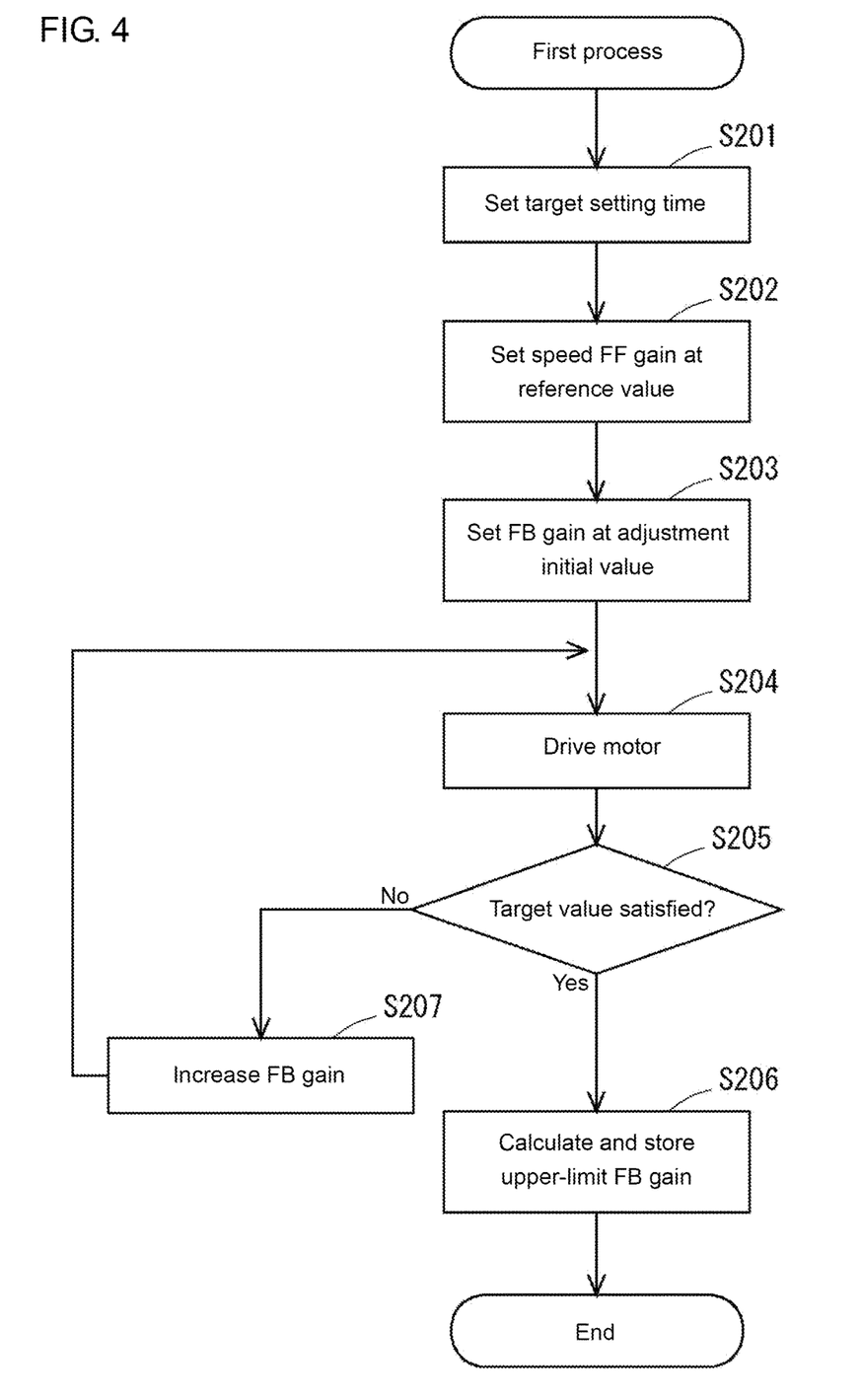
FIG. 4 is a flowchart of a first process included in the adjustment process in FIG. 3.
Figure 5:
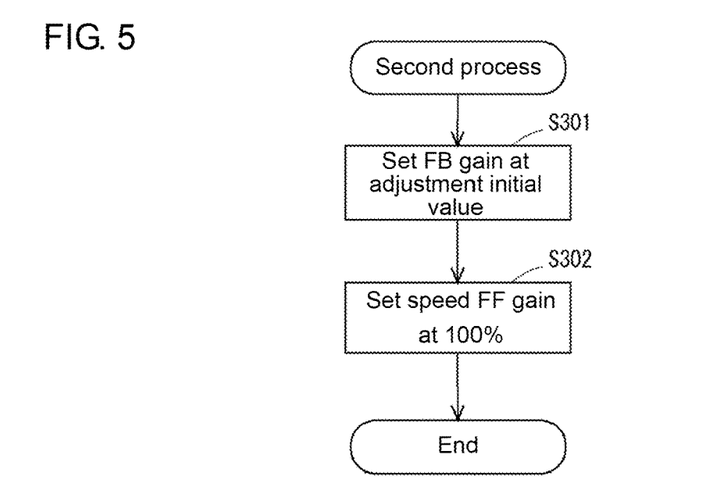
FIG. 5 is a flowchart of a second process included in the adjustment process in FIG. 3.
Figure 6:
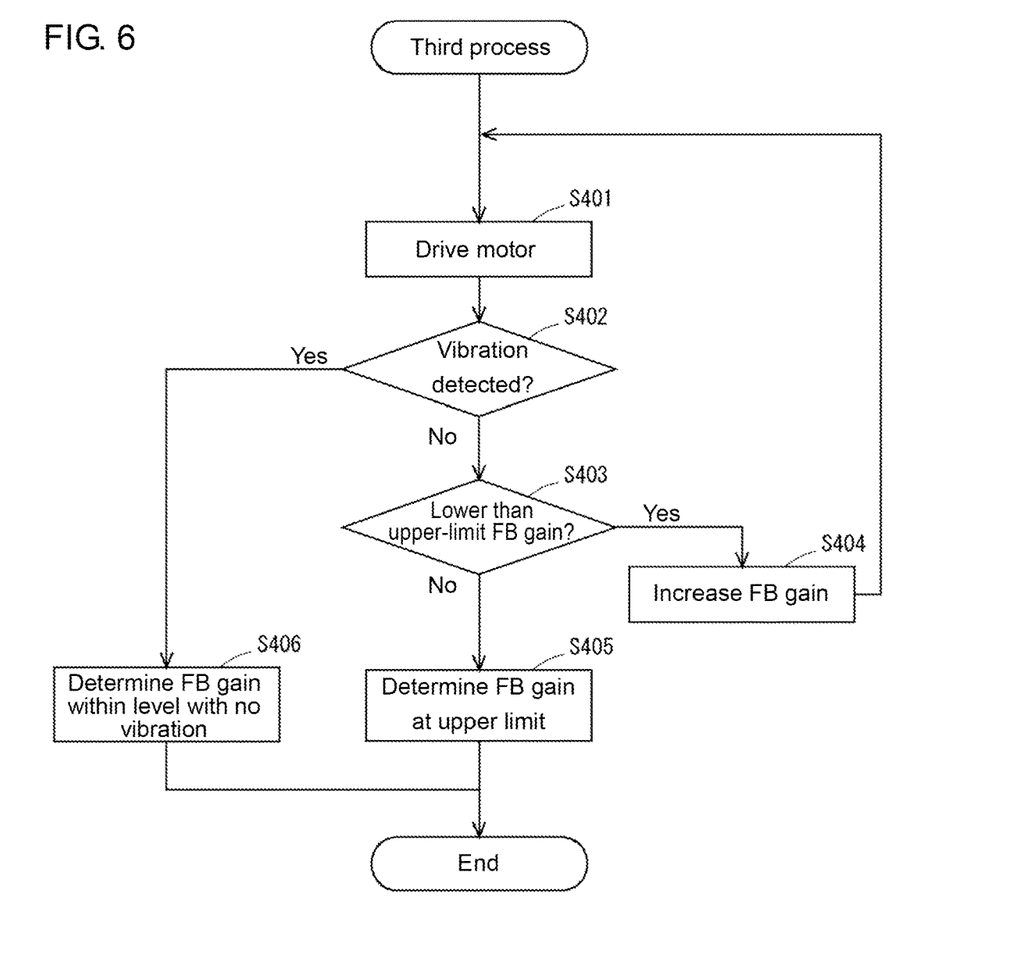
FIG. 6 is a flowchart of a third process included in the adjustment process in FIG. 3.

Specific processes for adjusting control parameters performed by these functional units will now be described with reference to FIGS. 3 to 6. FIG. 3 is a flowchart of the entire adjustment process. FIG. 4 is a flowchart of the first process included in the adjustment process. FIG. 5 is a flowchart of the second process included in the adjustment process. FIG. 6 is a flowchart of the third process included in the adjustment process. As shown in FIG. 3, the adjustment process is performed in the order of the first process (S101), the second process (S102), and the third process (S103).

The first process included in the adjustment process will now be described first with reference to FIG. 4. The first process is performed by the upper-limit-FB-gain calculator 93. In the first process shown in FIG. 4, the predetermined index used for calculating the upper limit of the feedback gain is the setting time measured by the setting-time measuring unit 91. First, in S201, the target value of the setting time (target setting time) is set. In the typical device 6, a short setting time indicates a prompt arrival at the target position. Thus, the device 6 with a smaller target value for the setting time may achieve intended characteristics in servo control on the motor 2. However, reducing the setting time involves effective reduction in vibrational movement around the target position and may increase the effect of the feedback gain. After the process in S201 ends, the processing advances to S202.

In S202, the speed feed-forward gain is set at a predetermined reference value. The predetermined reference value is a temporary value, and is 30% in the present embodiment. As described above, the first process is performed to calculate the upper limit of the feedback gain to allow the characteristics in servo control on the motor 2 to be intended characteristics. Thus, to understand the servo control characteristics more accurately with the predetermined index, the speed feed-forward gain is reduced to reduce the effect of the speed feed-forward control. The predetermined reference value of the speed feed-forward gain is not limited to 30%, and may be selected as appropriate based on, for example, the mechanical properties of the device 6. After the process in S202 ends, the processing advances to S203.

In S203, the feedback gain is set at the adjustment initial value. A relatively low value is selected as the adjustment initial value to prevent a sudden unstable operation of the motor 2 when the process S204 and subsequent steps are started. In S204, the motor 2 is then driven in accordance with the corresponding feedback gain with the speed feed-forward gain set at the predetermined reference value. For example, a position command for servo control performed for positioning for a predetermined distance is provided to drive the motor 2. While the motor is being driven, signals such as the signals from the controllers in the servo driver 4 or feedback signals from the encoder 2a are provided to the computer 9 for analyzing the operation of the motor 2. The analysis includes measuring the setting time with the setting-time measuring unit 91.

In S205, the determination is performed as to whether the measured setting time satisfies the target value set in S201. An affirmative determination result in S205 indicates that the currently set feedback gain satisfies intended servo control characteristics, or an intended setting time. Thus, the processing advances to S206, and the feedback gain satisfying the intended setting time is calculated as the upper-limit feedback gain and stored in a memory in the computer 9. In contrast, a negative determination result in S205 indicates that the currently set feedback gain fails to satisfy the intended servo control characteristics. Thus, the processing advances to S207 to increase the currently set feedback gain. The degree of increase of the feedback gain may be determined as appropriate. The processing then advances to S204 again to drive the motor with the increased feedback gain.

Thus, in the first process, the upper limit of the feedback gain at which the characteristics in servo control on the motor 2 can be intended characteristics is calculated with the speed feed-forward gain set at a relatively low value. In the current state, the upper limit of the feedback gain may not be usable as it is when the speed feed-forward gain is increased.

The first process is followed by the second process. The second process is performed by the FF-gain setting unit 94. As shown in FIG. 5, in S301 in the second process, the feedback gain is first set at the adjustment initial value. More specifically, in the second process following the first process in which the upper limit of the feedback gain is calculated, the feedback gain is restored to the relatively low adjustment initial value. Subsequently in S302, the speed feed-forward gain is set at a gain value (which may be 100%) higher than the predetermined reference value to increase track followability. More specifically, the speed feed-forward gain set at 30% in the first process is set at, for example, a higher value (for example, 100%) in the second process. When inertia or viscosity of the control target changes, the speed feed-forward gain to be set in S302 may be adjusted as appropriate from 100%. In this case, to increase the track followability, the torque feed-forward gain may be set at a relatively high gain value in addition to the speed feed-forward gain.

The second process is followed by the third process. The third process is performed by the FB-gain adjusting unit 95. As shown in FIG. 6, in S401 in the third process, the motor 2 is first driven in accordance with the currently set feedback gain with the speed feed-forward gain set at 100%. The motor 2 may be driven with the set control parameters in any manner that can determine whether the operation of the motor 2 causes vibration. During this motor driving, signals such as signals from the controllers in the servo driver 4 and feedback signals from the encoder 2a are provided to the computer 9 for analyzing the operation of the motor 2. The analysis includes detecting vibration with the vibration detector 92. After the process in S401 ends, the processing advances to S402.

In S402, the determination is performed as to whether the vibration detector 92 has detected vibration. An affirmative determination result in S402 indicates that, with the detection of vibration, the currently set feedback gain exceeds an appropriate value. Thus, the processing advances to S406 to determine, as the final feedback gain, a gain lower than the feedback gain that has caused vibration or the previously set feedback gain at which vibration is not detected by the vibration detector 92. In contrast, a negative determination result in S402 indicates that the currently set feedback gain has a margin of increase until vibration is detected. Thus, the processing advances to S403.

In S403, the current value of the feedback gain and the upper limit of the feedback gain stored in the memory in the computer 9 in the first process are compared to determine whether the current value is lower than the upper limit. More specifically, in S403, the determination is performed as to whether the current value has increased to the upper limit. When the determination result in S403 is affirmative, the feedback gain is increased in S404, and then the process S401 and subsequent steps are repeated. The degree of increase of the feedback gain may be determined as appropriate. When the determination result in S403 is negative, the processing advances to S405. In S405, the feedback gain is set at the upper limit.

In the above adjustment process, the upper limit of the feedback gain that can achieve the intended servo control characteristics is determined first, and the feedback gain is increased from the adjustment initial value with the speed feed-forward gain set at a value that can increase track followability (for example, 100%). Thus, without detection of vibration in the third process, the speed feed-forward gain highly relevant to track followability can be set at a value that can increase track followability (for example, 100%), and the feedback gain can be determined to be a value that sets the setting time at a predetermined target value. In other words, the control parameters can be easily adjusted to satisfy intended track followability and an intended setting time.

Figure 7:
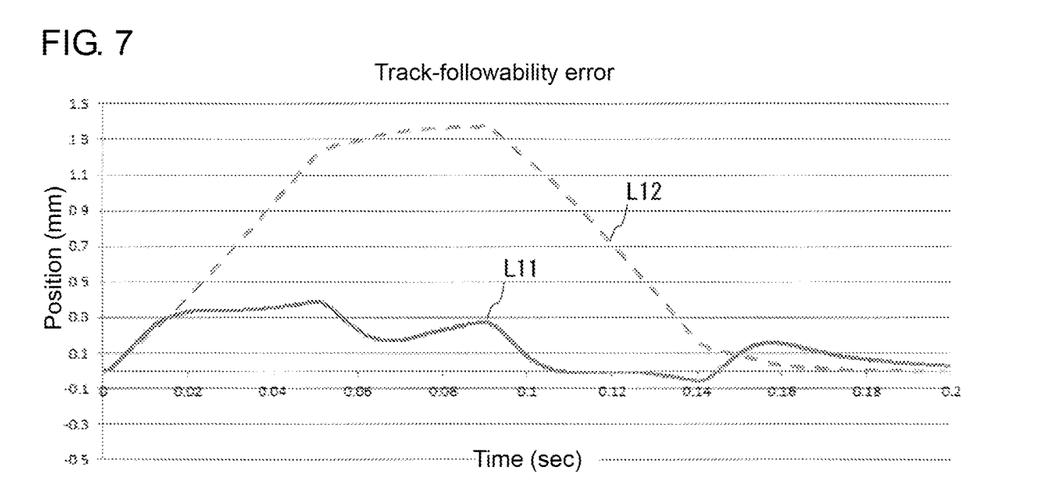
FIG. 7 is a graph showing track followability of the servo driver for which control parameters resulting from the adjustment process in FIG. 3 are set.

FIG. 7 shows a comparison between the transition (transition indicated with line L11) of a track-followability error (error between the actual position of the output shaft of the motor 2 and the position command) of the motor 2 with the settings of the speed feed-forward gain and the feedback gain adjusted in accordance with the adjustment process, and the transition (transition indicated with line L12) of a track-followability error with the gains adjusted with a known technique. The speed feed-forward gain in the former case is 100%, and the speed feed-forward gain in the latter case is 60%. The feedback gain in the former case is lower than the feedback gain in the latter case. As this shows, setting the speed feed-forward gain high is effective for reducing the track-followability error indicating track followability. Thus, the adjustment process according to the present embodiment that satisfies both intended track followability and an intended setting time is useful as a method for adjusting control parameters.

Modification 1

The upper limit of the feedback gain in the first process may be calculated while the filtering process for the position command is being performed by the position controller 41 based on the position proportional gain or the speed proportional gain in servo control. The filtering process for the position command allows the upper limit of the feedback gain to be accurately calculated when the position command in S204 contains a frequency component causing resonance. When the upper limit is accurate, the feedback gain obtained without detection of vibration in the third process can be an appropriate feedback gain that satisfies intended servo control characteristics satisfying a user intention. Thus, intended track followability and an intended setting time can both be achieved.

Modification 2

The adjustment of the feedback gain in the third process may be performed without performing the filtering process based on the position proportional gain or the speed proportional gain in servo control. The filtering process may degrade the track followability. In the third process, to achieve high track followability and a high feedback gain, the feedback gain is adjusted with the speed feed-forward gain set at 100%. Thus, adjusting the feedback gain with low track followability is unintended. As described above, in the third process, the feedback gain may be adjusted by the FB-gain adjusting unit 95 without performing the filtering process.

Modification 3

Figure 8:
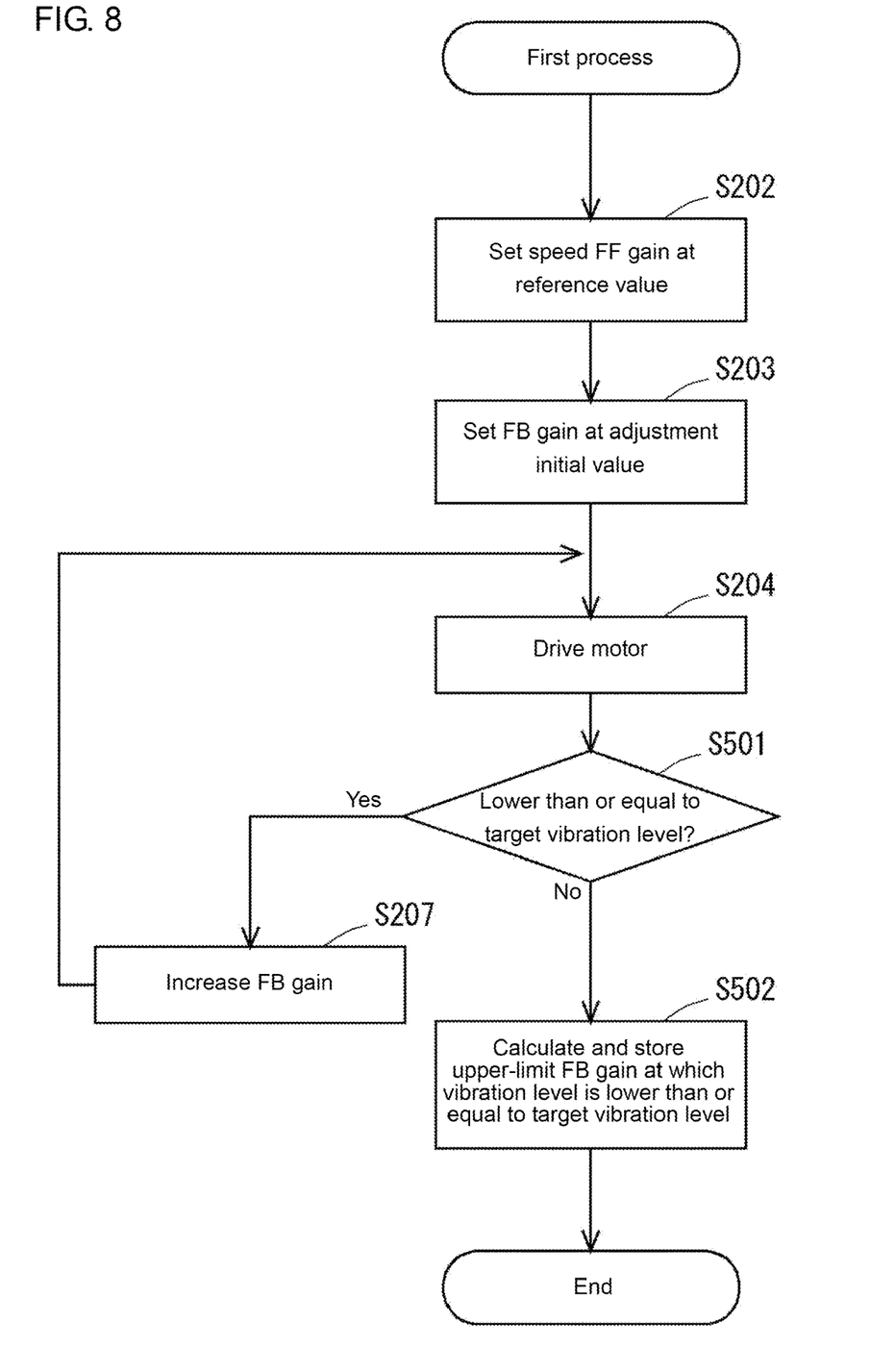
FIG. 8 is a flowchart of a modification of the first process included in the adjustment process in FIG. 3.

A modification of the first process will now be described with reference to FIG. 8. The processes that are common between the first process in the present modification and the first process shown in FIG. 4 are given the same reference signs without being described in detail. The first process according to the present modification does not include the process in S201 included in the first process shown in FIG. 4. The predetermined index in the first process according to the present modification is at the vibration level in servo control, and information about an intended vibration level is prestored in the computer 9. Vibration in servo control on the motor 2 is obtained by the vibration detector 92.

After the process in S204 ends, the processing advances to S501. In S501, the determination is performed as to whether the vibration level in servo control on the motor 2 in S204 is lower than or equal to a target level (allowable level). An affirmative determination result in S501 indicates that the vibration level is relatively low and the feedback gain still has a margin of increase. Thus, the processing advances to S207 to increase the currently set feedback gain. The degree of increase of the feedback gain may be determined as appropriate. The processing then advances to S204 again, and the motor is driven at the increased feedback gain. In contrast, a negative determination result in S501 indicates that, with detection of vibration, the currently set feedback gain exceeds an appropriate value. Thus, the processing advances to S502, and the gain at which the vibration level is lower than or equal to the target vibration level is calculated as a final feedback gain. In other words, the feedback gain before being increased and for which the previous determination result in S501 is affirmative is calculated as the final feedback gain. The final feedback gain is stored in the memory in the computer 9.

The third process is performed after the first process is performed. Without detection of vibration in the third process, the speed feed-forward gain highly relevant to track followability can be determined to be a value that can increase track followability (for example, 100%), and the feedback gain can be determined to be a highest value within the range in which vibration can be reduced. In other words, the control parameters can be easily adjusted to satisfy intended track followability and intended vibration reduction.

Modification 4

Figure 9:
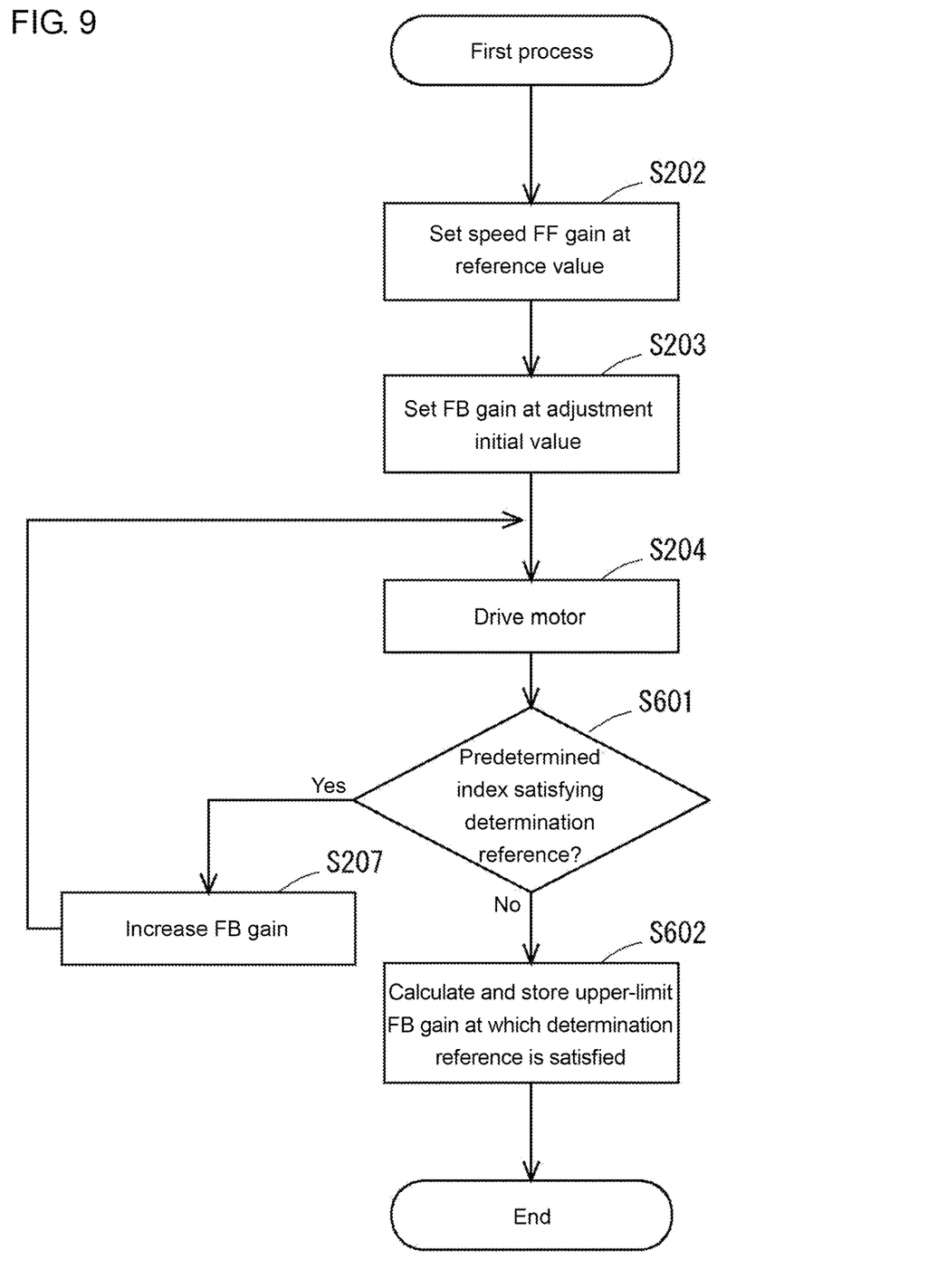
FIG. 9 is a flowchart of another modification of the first process included in the adjustment process in FIG. 3.

Another modification of the first process will now be described with reference to FIG. 9. The processes that are common between the first process in the present modification and the first process shown in FIG. 4 are given the same reference signs without being described in detail. The first process according to the present modification does not include the process in S201 included in the first process shown in FIG. 4. The predetermined index in the first process according to the present modification is the peak gain in frequency response characteristics of a speed closed loop in a servo control structure, or the gain margin or the phase margin calculated from a speed open loop. When the peak gain is used as an index, the threshold for determination reference is, for example, smaller than or equal to 1 dB. When the gain margin is used as an index, the threshold for determination reference (predetermined gain margin value) is, for example, greater than or equal to 10 dB. When the phase margin is used as an index, the threshold for determination reference (predetermined phase margin value) is, for example, greater than or equal to 45 degrees. Information about each threshold for the reference is prestored in the computer 9. The peak gain, the gain margin, or the phase margin in servo control on the motor 2 is obtained by the margin determination unit 96.

After the process in S204 ends, the processing advances to S601. In S601, the determination is performed as to whether the peak gain in frequency response of the speed closed loop, or the gain margin or the phase margin calculated from the speed open loop in servo control on the motor 2 in S204 satisfies the determination reference. When the determination result in S601 is affirmative, the peak gain is relatively low, or the gain margin or the phase margin is relatively large. Thus, an affirmative determination result in S601 indicates that the feedback gain still has a margin of increase. Thus, the processing advances to S207 to increase the currently set feedback gain. The degree of increase of the feedback gain may be determined as appropriate. The processing then advances to S204 again, and the motor is driven at the increased feedback gain. In contrast, when the determination result in S601 is negative, the peak gain is relatively high or the gain margin or the phase margin is relatively small. Thus, a negative determination result in S601 indicates that the currently set feedback gain exceeds an appropriate value. Thus, the processing advances to S602. In S602, the gain at which the peak gain is lower than or equal to the corresponding reference threshold, or the gain at which the gain margin or the phase margin is larger than or equal to the corresponding reference threshold is calculated as a final feedback gain. In other words, the feedback gain before being increased, for which the previous determination result in S601 is affirmative and at which the predetermined index satisfies the determination reference is calculated as the final feedback gain. The final feedback gain is stored in the memory in the computer 9.

The third process is performed after the first process is performed. When the predetermined index satisfies the determination reference in the third process, the speed feed-forward gain highly relevant to track followability can be determined to be a higher value (for example, 100%), and the feedback gain can be determined to be a highest value within the range in which vibration can be reduced. In other words, the control parameters can be easily adjusted to satisfy intended track followability and intended vibration reduction.

APPENDIX 1

A method for adjusting control parameters for a control device including a feedback unit and a predetermined control structure, the feedback unit including one or more controllers (41, 42, 43) to receive an input of a feedback signal for servo control on a control target as feedback, the predetermined control structure being configured to perform speed feed-forward control in the feedback unit, the method comprising:

(S101) calculating an upper limit of a feedback gain of the feedback signal within a range in which a predetermined index for the feedback gain satisfies a predetermined target value with a speed feed-forward gain for the speed feed-forward control set at a predetermined reference value;

(S102) setting the feedback gain at an adjustment initial value lower than the upper limit, and setting at least the speed feed-forward gain at a predetermined increased value higher than the predetermined reference value; and (S103) increasing the feedback gain from the adjustment initial value within a range in which the feedback gain does not exceed the upper limit with the speed feed-forward gain set at the predetermined increased value.

The invention claimed is:

1. A method, implemented by a computer, for adjusting control parameters for a control device including a feedback unit and a predetermined control structure, the feedback unit including one or more controllers to receive an input of a feedback signal for servo control on a control target as feedback, the predetermined control structure being configured to perform speed feed-forward control in the feedback unit, the computer comprising an upper-limit-feedback-gain-calculator, a feed-forward-gain-setter, and a feedback-gain-adjuster, the method comprising:
calculating, by the upper-limit-feedback-gain-calculator,
an upper limit of a feedback gain of the feedback signal within a range in which a predetermined index for the feedback gain satisfies a predetermined target value with a speed feed-forward gain for the speed feed-forward control set at a predetermined reference value;

setting, by the feed-forward-gain-setter, the feedback gain at an adjustment initial value lower than the upper limit, and setting, by the feed-forward-gain-setter, at least the speed feed-forward gain at a predetermined increased value higher than the predetermined reference value; and increasing, by the feedback-gain-adjuster, the feedback gain from the adjustment initial value within a range in which the feedback gain does not exceed the upper limit with the speed feed-forward gain set at the predetermined increased value.

2. The method according to claim 1, wherein
the predetermined increased value is 100%.

3. The method according to claim 1, wherein
the predetermined index is an index for a setting time for the control target under servo control based on the predetermined control structure, and
the upper limit is a value of the feedback gain at which the predetermined index is within a target setting time being the predetermined target value.

4. The method according to claim 1, wherein
the predetermined index is an index for vibration of the control target under servo control based on the predetermined control structure, and
the upper limit is a value of the feedback gain at which the predetermined index is lower than or equal to a vibration level being the predetermined target value.

5. The method according to claim 1, wherein
the predetermined index is an index for a gain or a phase obtained from a speed open loop or a closed-loop gain in a frequency response of a speed closed loop in the predetermined control structure under servo control based on the predetermined control structure, and
the upper limit is a value of the feedback gain at which the predetermined index is lower than or equal to a predetermined peak gain or higher than or equal to a predetermined gain margin or a predetermined phase margin.

6. The method according to claim 1, wherein
in the increasing the feedback gain from the adjustment initial value, in response to a vibration level of the control target exceeding an allowable level, a value of the feedback gain is determined within a range in which the vibration level is within the allowable level.

7. The method according to claim 1, wherein
the calculating the upper limit of the feedback gain is performed while a filtering process is being performed based on a position proportional gain or a speed proportional gain in the servo control.

8. The method according to claim 1, wherein
in the increasing the feedback gain, the feedback gain is adjusted without a filtering process being performed based on a position proportional gain or a speed proportional gain in the servo control.

* * * * *